S. JENCICK.
INDICATING MECHANISM.
APPLICATION FILED JUNE 2, 1916.
1,331,771.
Patented Feb. 24, 1920.
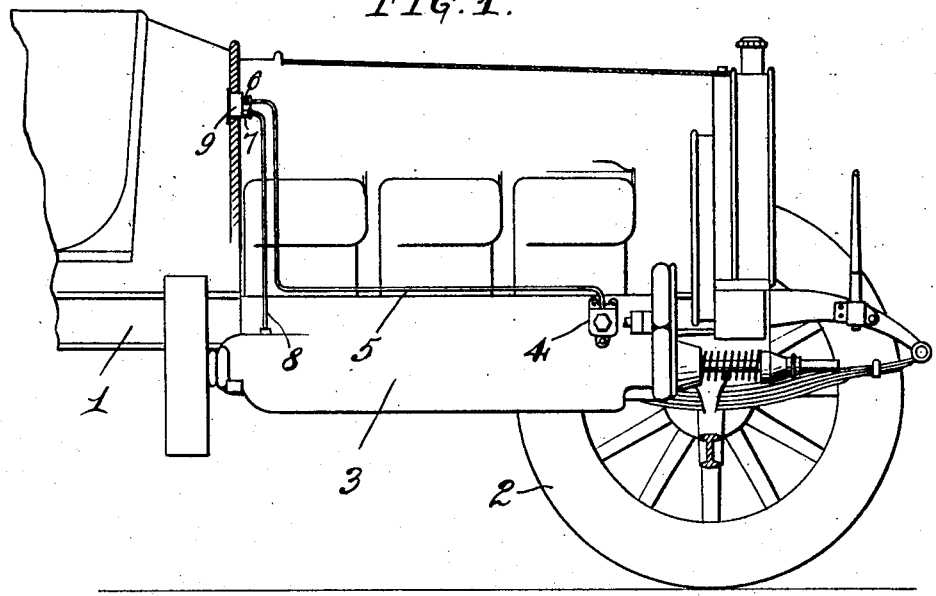
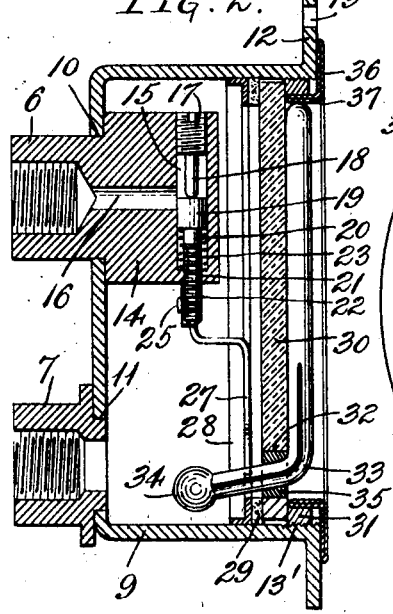
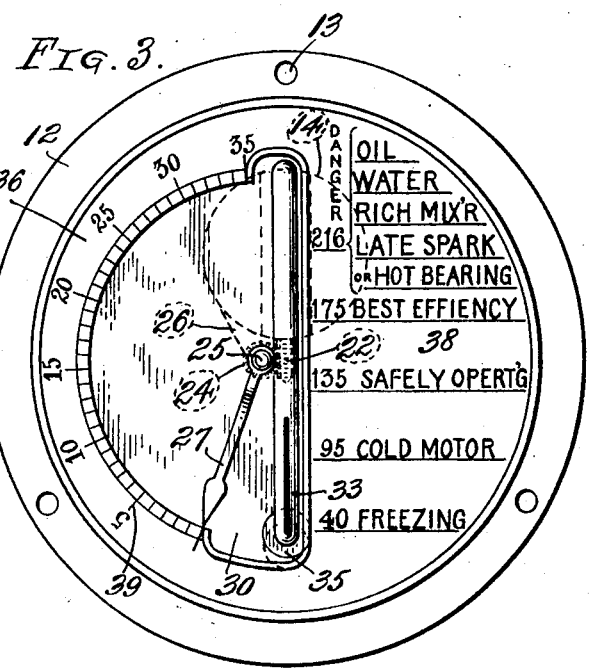
Inventor.
Stephen Jencick
By Brockett and Hyde
Att'ys.

UNITED STATES PATENT OFFICE.

STEPHEN JENCICK, OF CLEVELAND, OHIO, ASSIGNOR TO GUSTAVUS A. SCHANZE, OF CLEVELAND, OHIO.

INDICATING MECHANISM.

1,331,771. Specification of Letters Patent. Patented Feb. 24, 1920.

Application filed June 2, 1916. Serial No. 101,300.

*To all whom it may concern:*

Be it known that I, STEPHEN JENCICK, a subject of the Emperor of Austria, residing at Cleveland, in the county of Cuyahoga and State of Ohio, have invented certain new and useful Improvements in Indicating Mechanism, of which the following is a specification.

This invention relates generally speaking to indicating devices and particularly to that class of such devices employing means for indicating the running condition of a motor of a motor vehicle.

More specifically the invention relates to a motor indicator comprising means connected to the oil circulating system for indicating the various conditions of the circulating oil, for example the pressure of circulating and the temperature of the oil.

The invention may further be briefly summarized as consisting in the construction and combination of parts hereinafter set forth in the following drawings, description and claims.

Referring to the drawings Figure 1 is a view of a portion of a motor vehicle showing my apparatus applied thereto; Fig. 2 is a cross section of the indicator; and Fig. 3 is a front elevation.

In the embodiment shown in the drawings 1 represents the frame of a motor vehicle supported upon wheels such as 2. Mounted on the frame is a suitable engine 3 having an oil circulating pump 4 of any preferred type connected by a pipe 5 with an indicator inlet connection 6. A lower outlet connection 7 is connected by a pipe 8 to any suitable part of the crank casing. The description thus far merely relates to one type of arrangement which is satisfactory in operation and it is obvious that any type of oil circulating system may be used in connection with the indicator.

The indicator comprises a cup shaped casing 9 having an opening 10 for the inlet connection 6 and an opening 11 for the outlet connection 7, the latter being arranged near the bottom part of the casing at a point above the same to produce a deposit of a small amount of oil at this point. The casing 9 has an outwardly extending flange 12 provided with openings 13 to receive screws or other supporting devices. The casing is internally threaded at 13′ for a purpose to be described. The inlet connection 6 within the casing 9 is provided with an enlarged pressure cylinder member 14 which is preferably circular as shown in dotted lines in Fig. 3, and is provided with a chamber 15 and communicating by a port 16 with the threaded opening in the casing 6.

A plug 17 is screwed into the pressure cylinder member at the upper end of the chamber 15 in order to close the chamber at this point and this plug is provided with an extension 18 for limiting the movement of the plunger as will appear. Slidably mounted in the barrel is a plunger or piston 19 having a reduced stem 20 adapted to project through a reduced opening 21. This stem is provided with annular ribs 22 fitting more or less loosely the bore at the opening 21. A spring 23 is arranged between the plunger 19 and the shoulder formed by the reduced opening 21 so that the plunger is normally forced upward into engagement with the extension 18. There is sufficient clearance about the plunger and the annular flanges or ribs 22 so that oil may leak past and drip from the lower end of the stem 20 for a purpose to be described.

The annular ribs 22 form a rack which meshes with a pinion 24 mounted upon a pin 25 supported in a plate 26 secured to the front end of the pressure cylinder member 14. On the outside of this plate the pin 25 is provided with an index hand 27 adapted to move in alinement with various graduations arranged upon a dial as will appear. It is obvious from the foregoing construction that as the oil is supplied to the pressure cylinder by the circulating pump 4 it will force the plunger down and move the index hand 27 in a clockwise direction, as shown in Fig. 3, an amount corresponding to the pressure of the oil. It is also obvious that by reason of the leakages past the plunger and the stem oil will drip from the lower end of this stem to the bottom of the casing from whence it will pass out through the exhaust connection 7.

In front of this pressure cylinder member is a stop ring 28, angular in cross section and forced into place by pressure or held by any other suitable means. Engaging the front face of this ring is a gasket 29 on the inside of a glass 30 which is held in place by a ring 31 engaging the threaded portion 13′ of the casing 9. The glass 30 is provided with an opening 32 near the bottom for receiving the tube 33 of a thermometer or other heat responsive device. This tube is provided with the usual bulb 34 which is preferably arranged directly under the stem 20 so that the oil will drip from the latter directly onto the former. Suitable heat responsive liquid is provided in the bulb 34, and the tube operates in a manner similar to the operation of the usual thermometer.

The tube 33 is extended up the face of the glass as is shown and is held in place by cement 35 packed into the opening 32 about the tube 33. Engaging inside of the ring 31 is an inwardly extending flange of a dial and this dial is made up of a flat peripheral portion 36 adapted to rest against the outer face of the flange 12 with the metal crimped in to form a flange 37 and leaving a half indicating portion 38, as shown in Fig. 3, for various indications and legends which are arranged along the edge thereof corresponding to the side of the thermometer tube 33. On the opposite side of the center this dial plate is provided with suitable graduations 39 with which the hand registers at various points to indicate the pressure of the lubricants.

It will be seen from the foregoing description that when the motor is operating and the oil is circulating the pressure will be indicated by reason of the fact that the pressure cylinder plunger will be moved downward and the index hand 27 will be rotated in a clockwise direction and will indicate on the dial the pressure of the circulating oil. Oil, however, moves past the plunger and past its stem and drops down upon the thermometer tube 34 and forms a pool in the bottom of the casing into which the bulb projects. This causes the thermometer or the heat responsive element to indicate the heat condition of the oil or lubricant.

The great advantage in this device over devices for similar purposes which operate in conjunction with the cooling system is that the temperature of the cooling fluid does not necessarily indicate the heat conditions of the motor inasmuch as variation in the thickness of the cylinder walls, a sluggish circulation of the water and various other conditions may affect the indicator and give a wrong impression. For example, suppose a bearing were to heat then there would be no indication in a device which operated in conjunction with the cooling fluid or system. In the present device the oil comes directly in contact with the various parts the bearings included and is circulated about the pistons in the cylinders and of necessity its heat condition is more apt to furnish the desired information necessary to determining the proper or improper running conditions of the motor.

The combined use of the pressure indicator with the heat responsive indicator is of great value for the reason that it is a well known fact that a lubricant at a low temperature will produce greater pressure in a pressure device than a high temperature and these facts should be known to the operator, and they work hand in hand to give the proper indication as to the conditions which are prevailing with respect to the running of the motor.

There is also a very important feature in favor of this invention in that it may operate on an air cooled motor.

It is also a feature of the present device that the operator may check the operation of the pressure gage as well as the heat condition indicator by the sight feed effect of the oil dropping from the stem of the gage plunger.

The three features are essential to perfect indication in that one checks the other and they all work together to give the prevailing running condition.

Having described my invention, I claim:

1. The combination with the motor of a motor vehicle, and an oil circulating system therefor, of means connected to said system for simultaneously indicating the temperature and pressure of the oil therein and thereby also indicating the condition of the motor.

2. The combination with the motor of a motor vehicle, and an oil circulating system therefor, of a self contained device connected to said system and through which device the oil from said system is circulated, and means carried by said device and affected by oil circulated therethrough for simultaneously indicating its pressure and temperature and thereby also indicating the condition of the motor.

3. The combination with the motor of a motor vehicle, and an oil circulating system therefor, of a hollow casing, means for circulating the oil from said circulating system through said casing, and means carried by said casing and affected by oil flowing therethrough for simultaneously indicating its pressure and temperature and thereby also indicating the condition of the motor.

4. The combination with an oil circulating system for the motor of a motor vehicle, of means for simultaneously indicating the temperature and pressure of the oil in said system.

5. The combination with an oil circulating system for the motor of a motor vehicle, of means for simultaneously indicating the temperature and pressure of the oil in said system, said means producing a visible indication of the flow of oil in said system.

In testimony whereof I affix my signature in presence of two witnesses as follows.

STEPHEN JENCICK.

Witnesses:
GUY O. FARQUHARSON,
D. TOZER.